June 10, 1930.                    C. D. MORTON                    1,762,560
                                METHOD OF FILTERING
                    Filed July 15, 1927          2 Sheets-Sheet 2

INVENTOR
Charles D. Morton
BY
ATTORNEY

Patented June 10, 1930

1,762,560

UNITED STATES PATENT OFFICE

CHARLES D. MORTON, OF NEW YORK, N. Y., ASSIGNOR TO MORTON SYSTEM, INC., OF NEW YORK, N. Y., A CORPORATION OF NEW YORK

METHOD OF FILTERING

Application filed July 15, 1927. Serial No. 205,906.

This invention relates to a method for separating the solid matter from liquids, in which said solid matter is held in suspension, and is particularly adapted for filtering liquids, such as sewage, though it may be applied to other liquids.

The main purpose and accomplishment of this apparatus is to maintain an indefinitely unclogged filtering medium, with a constant rate of filtering flow.

In general, it may be stated that regardless of the types of filtering apparatus, their method has practically always been the same,—namely, to start with a clean filtering medium, and as it becomes clogged, to increase filtering pressure up to a point where no further action takes place. This necessitates periodic and frequent clearing.

As far as I am aware there has been no method of filtering which would continuously and indefinitely remove solids from liquid, particularly where the percentage of solid to liquid is extremely small.

In the case of sewage, the percentage of solid matter is so small that it is stated in parts per million gallons, hence to successfully remove the solids from such a vast flow of liquid it is necessary that the filtering medium be maintained in a constant condition of highest efficiency.

Screens have been used which would permit a free passage of sewage flow, but so little solid matter is removed that the primary object of preventing water pollution is not accomplished. This is due to the necessity of using large openings in the filtering screens, to prevent clogging.

In my invention, I can employ an extremely fine screen, which removes over 90% of the settlable solid matter. This fine screen, if used as a filtering medium in any prior method known to me, would become blinded in a very short time.

My invention employs a rotating filtering cylinder, mounted in a closed cylinder, with an inlet connection for the unfiltered liquid and a discharge connection for unfiltered liquid and the removed solids. The filtered liquid passes out through a hollow shaft serving as the axis of filtering cylinder. The control of this outgoing filtrate, or of the intake pressure, or both, is such that the filtering cylinder is kept submerged and a predetermined relation is maintained between the filtering pressure, existing in the interior of the casing and reacting on the filtering cylinder and that back pressure inside of said filtering cylinder, these relations being co-ordinated also with the speed of motion of the filtering medium, so that whereas the liquid passes freely through the screen the solids are repelled or prevented from caking on the screen by reason of the centrifugal effect. The space between the filtering cylinder and the closed cylinder should be narrow, and the liquid and solids are circulated lengthwise through this space at a rate which keeps the solids constantly moving until they are discharged through the sludge outlet. The entire operation is continuous, unfiltered liquid being continuously supplied through the intake, and filtrate and sludge being continuously conducted away.

A back-pressure valve is preferably placed on a sludge outlet, which is located at the bottom of the casing at opposite end from the raw liquid inlet. The purpose of this is to react against the head or pressure of incoming raw liquid, thereby keeping the space between the casing and rotating drum or filter medium filled with this liquid to be filtered, which exerts the required pressure against the rotating filter medium.

In the accompanying drawings forming a part hereof:

Figure 1:
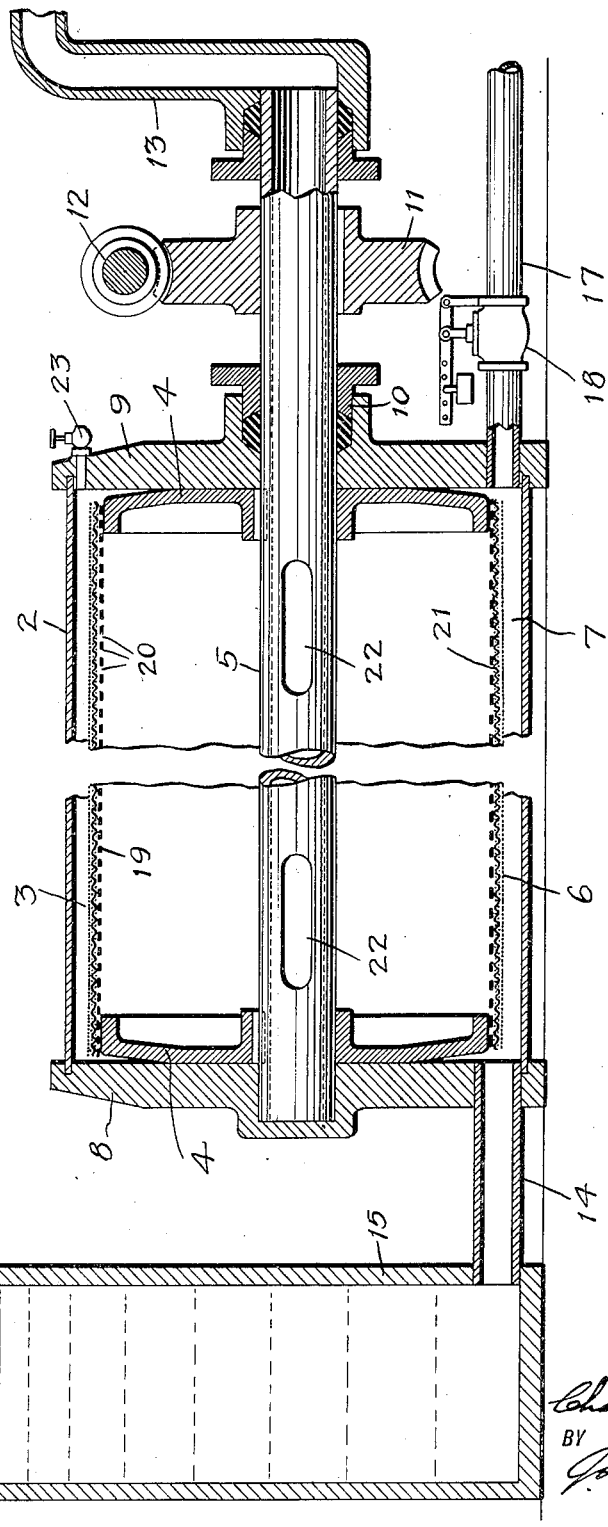
Fig. 1 is a longitudinal section through the apparatus.
Figure 2:
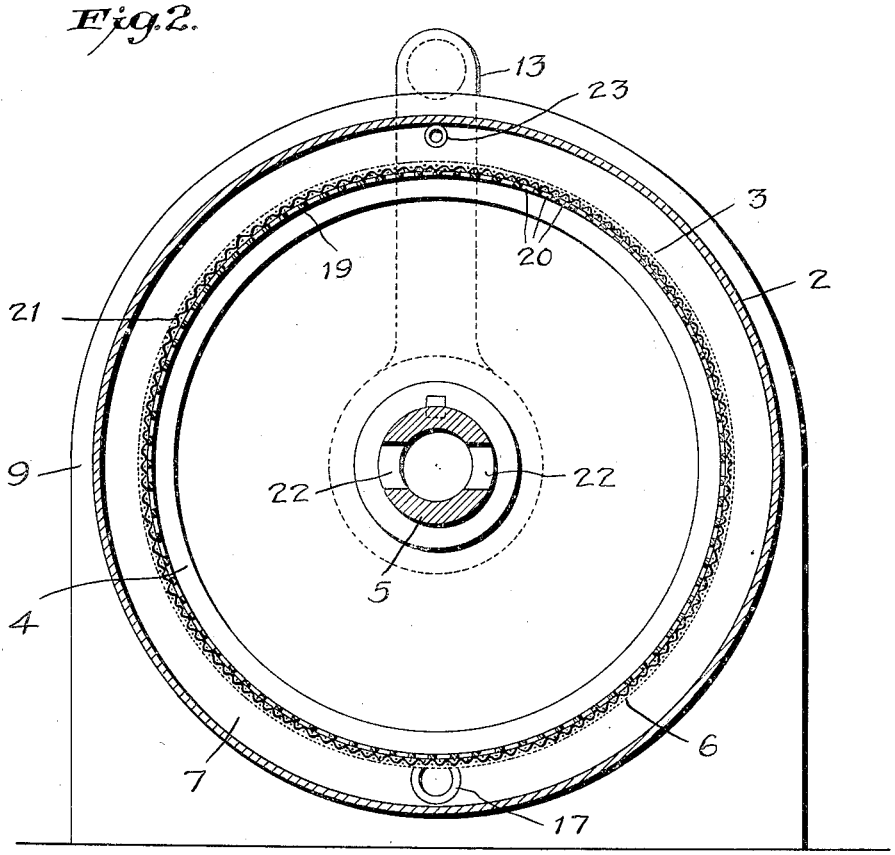
Fig. 2 is a cross-section.
Figure 3:
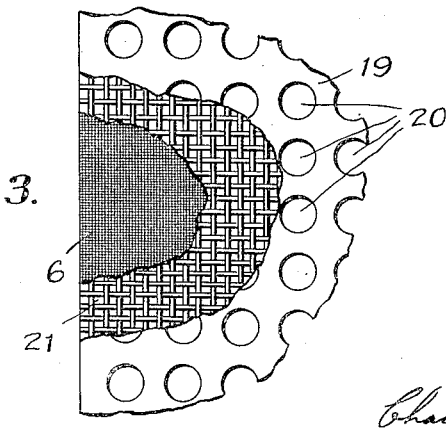
Fig. 3 is a fragmentary detail view.

The filter has a horizontal cylindrical casing 2, in which is mounted a hollow cylindrical rotary filtering element 3, this element comprising closed ends 4 fixed to a hollow shaft 5, with a screen 6 of exceedingly fine mesh carried by said ends and forming the sides of the filtering element. The outside diameter of the filtering element is preferably slightly less than the internal diameter of the casing, leaving a narrow space 7 between the filtering element and the casing to be occupied by the liquid to be filtered.

The shaft 5 is journaled in the heads 8, 9 of the casing and extends outward through a stuffing-box 10 in the head 9. The outwardly projecting portion of the shaft bears a worm-wheel 11, meshed by a worm 12 for driving the filtering element at a required speed from an electric motor or other source of power.

The hollow shaft 5 has inlet openings or slots 22 within the filtering element 3, and its outer end opens into a stationary discharge conduit section 13, with which it has a fluid-tight connection, the said conduit 13 extending upward to or above the level of the top of the filtering element 3, so as to maintain a static head on the filtrate, insuring that the filtering element will be constantly full of liquid or submerged, the casing itself being full of the liquid and solids to be filtered or separated.

The sewage or other liquid to be filtered is admitted to the lower portion of the casing through an inlet connection 14, which preferably opens through the head 8 immediately adjacent the lowest point of the cylindrical wall of the casing 2. The said inlet connection leads from the bottom of the stand-pipe 15, to which the sewage or other liquid is admitted through an inlet 16. The standpipe is of sufficient height to maintain a head of liquid which imposes a moderate hydrostatic pressure on the liquid within the casing.

From the opopsite end of the casing, or at a point remote from the inlet connection 14 and at or near the bottom of the casing, there extends an outlet pipe 17 for continuously conducting off sludge or unfiltered liquid. This outlet is provided with an adjustably loaded back-pressure valve 18, or its equivalent, for holding the back-pressure in the casing.

At the top or upper portion of the casing, preferably in the head 9, there is a valve vent 23, the valve of which is normally closed but can be opened manually for a purpose hereinafter referred to.

Instead of the stand-pipe 15, other means may be employed for continuously supplying the sewage or other liquid under pressure to the casing, where it is caused to circulate outside of the filtering element in a general longitudinal direction, the unfiltered or concentrated liquid or sludge passing out continuously through the outlet 17 against the back-pressure of the valve 18. The adjustment of the valve 18 in connection with the height of liquid in the stand-pipe 15, or the pressure under which the flow of liquid may be otherwise supplied to the casing, determines the pressure in the confined space between the wall of the casing and the hollow filtering element; at the same time the elevated filtrate discharge 13 keeps the screen or filtering element submerged or full of liquid and maintains a hydrostatic head on the outflowing filtrate. The filtering pressure should be as low as possible, and while I have never been able to measure the actual filtering pressure, it seems possible that it is on the order of one pound per square inch, or even less. The pressures, which, of course, must be determined with reference to the liquid to be filtered and to some extent with reference to the proportions of the apparatus, bear such relation to the speed of rotation, and therefore of lineal travel of the filter element, and necessarily to the order of fineness of the openings therein, that the liquid is permitted to pass freely through the filtering element, whereas the solids are repelled or averted and prevented from clogging the screen. This result is believed to be due, in part at least, to the centrifugal effect, and in considerable measure to the scouring or dislodging action of the comparatively rapidly traveling filter material, the effective filtering pressure being insufficient to hold solids in contact with the filtering medium in opposition to these rotative effects.

In the case of a screen twenty inches in diameter and sixty inches long, the screen should be driven at about eighty revolutions per minute, so that the linear speed is in the neighborhood of 400 feet per minute. This is given merely by way of illustration, since the speed will necessarily be varied for different liquids and with different sizes of apparatus. A filter of such dimensions requires a clearance of not more than about one inch between the screen and the outside cylinder in order to provide that speed of longitudinal flow which will keep the solids in motion toward the sludge outlet.

It will be understood that the liquid and solids outside the screen do not flow in straight longitudinal lines from the inlet 14 to the outlet 17, but are presumably caused to circulate in a more or less spiral path. The narrowness of the space in question is important since it insures a rate of flow outside the screen which continuously carries away the solid particles which are not permitted to gain lodgment on or in the screen.

The actual filtering pressure can not very well be measured. In the example under consideration, and when handling sewage at a rate represented by an input of about one hundred gallons per minute and an outflow composed of about ninety gallons of filtrate and ten gallons of sludge per minute, an indicated gauge pressure of five pounds in the casing has been found satisfactory.

The nature of the filtering element or medium is also important. For sewage, I employ an exceedingly fine wire screen. A 100 mesh screen affords exceedingly rapid filtering, and the filtrate is practically 100% free of solids. To support this delicate mesh, it is preferably applied to a metal cylinder 19 attached to the ends 4, this cylinder having large openings 20 throughout its area and the openings being bridged by a cross-screen 21, on which the filtering screen 6 is immediately supported. In the case of liquids, such as sugar juices, a cloth may serve as the filtering medium.

In the operation of filtering sewage, the sewage is maintained in the stand-pipe 15 at a level moderately elevated above the top of the casing, and under this head constantly enters the casing through the inlet connection 14. The filtering element is constantly rotated about its substantially horizontal longitudinal axis at a speed which in connection with the pressure prohibits the lodgment of solids in the interstices of the screen; the liquid alone passes through into the interior of the screen and by way of the slots 22 and the interior of the shaft 5 to and through the elevated filtrate discharge 13. The sludge, that is to say the remaining portion of the liquid containing the solids, is constantly discharged through the outlet 17, past the back-pressure valve 18. The sludge thus discharged may be disposed of in the ordinary manner, or if not sufficiently thickened it may be again circulated through the filter by appropriate connections or returned to the stand-pipe. Instead of the stand-pipe other means may be employed for supplying the raw liquid to the filter under the required amount of pressure. Instead of the back-pressure valve 18 a fixed back-pressure aperture could be used in conjunction with means for adjusting the pressure of the liquid supplied to the casing, or both the supply pressure and the back-pressure may be considered to be regulated, these matters being relative. The elevated filtrate discharge 13 constitutes the simplest, and at the same time the most effective, means for keeping the filter full of liquid and for maintaining the static head on the outflowing filtrate, but other or adjustable means might be employed for the purpose.

With this apparatus and method, the filtering of sewage or other liquid can be conducted indefinitely at a non-varying rate, without caking, clogging or area impacting of the filtering element, which after prolonged operation is found to be substantially as clear and free as at the beginning. When liquid is first admitted to the casing the vent 23 is opened to permit the escape of air, and is closed when the liquid appears at this opening, showing that all the air has been displaced and that the casing is full of liquid. The narrowness of the space 7 between the cylindrical wall of the casing and the cylindrical filtering element causes all portions of the raw liquid to be in close proximity to the screen and causes the area of the filtering medium to be very large as compared with the volume of raw liquid which is circulated outside of it.

I have operated my filter on sewage for many hours, with a never varying rate of flow, and, when opened, the screen was found in a perfectly clean condition.

In connection with the very serious problem of removing polluting solids from sewage, my apparatus possesses a particular value, because of its unique ability to filter sewage at an extremely high rate, without clogging, and because of the simplicity of construction.

My construction and mehod are, I believe, the first wherein a condition is maintained such as not to permit of any "imbedding" or impacting of the solid particles in the filtering medium. In the case of fine wire mesh filtering medium, the filtering pressure is extremely low and as the solids are prevented from interfering, the rate of filtration is almost as rapid as if clear water were passed through. This, of course, is a most desirable result in the handling of raw sewage.

Various modifications and changes will suggest themselves to those skilled in the art.

I claim:

1. The method of filtering liquids containing solids in continuous operation, which comprises circulating under pressure a stream of the liquid to be filtered lengthwise of a narrow annular space surrounding a hollow cylindrical filtering medium, continuously conducting off filtrate from the interior of the cylindrical filtering medium, continuously conducting off unfiltered liquid and the solids from said space, continuously rotating said filtering medium, and so coordinating the pressure, the rotative speed and the rate at which the liquid circulates through said space as to cause the medium to remain free of solids indefinitely.

2. The method of filtering liquids containing solids in continuous operation, which comprises circulating under pressure a stream of the liquid to be filtered lengthwise of a narrow annular space surrounding a substantially horizontal hollow cylindrical filtering medium, continuously conducting off filtrate from the interior of the cylindrical filtering medium, continuously conducting off unfiltered liquid and the solids from said space, continuously rotating said filtering medium, and so coordinating the pressure, the rotative speed and the rate at which the liquid circulates through said space as to cause the medium to remain free of solids indefinitely.

3. The method of filtering a liquid containing solids in suspension, by passing under pressure a continuously replenished stream of the raw liquid lengthwise of a narrow annular space surrounding a relatively large hollow filtering medium so that the flow of raw liquid is confined along the surface of said medium, continuously rotating said filtering medium, keeping the interior of the filtering medium filled with liquid while conducting off filtrate therefrom, discharging the sludge from said space, and so coordinating the pressure, the rotative speed and the rate of flow as to cause the medium to remain free of solids indefinitely.

CHARLES D. MORTON.